United States Patent [19]

Thomas et al.

[11] Patent Number: 4,745,137

[45] Date of Patent: May 17, 1988

[54] POLYURETHANES PREPARED FROM SOLUTIONS OR DISPERSIONS OF POLYMERS OF RIGID POLYAROMATIC MONOMERS IN POLYOLS

[75] Inventors: Oomman P. Thomas; Robert B. Turner, both of Lake Jackson, Tex.

[73] Assignee: The Dow Chemical Company, Midland, Mich.

[21] Appl. No.: 73,040

[22] Filed: Jul. 14, 1987

Related U.S. Application Data

[63] Continuation-in-part of Ser. No. 878,460, Jun. 25, 1986, abandoned.

[51] Int. Cl.$^4$ .............................................. C08G 18/14
[52] U.S. Cl. ................................. 521/137; 521/163; 521/164; 521/167; 521/172; 524/251; 524/261; 524/269; 525/124; 525/130; 525/131
[58] Field of Search ............... 521/137, 163, 164, 167, 521/172, 173, 174, 176, 177; 524/251, 261, 269; 525/124, 130, 131

[56] References Cited

U.S. PATENT DOCUMENTS 3,872,050  3/1975  Benton et al. ...................... 524/774

FOREIGN PATENT DOCUMENTS 56-152830  11/1981  Japan .

OTHER PUBLICATIONS

Sato, *Lorima Daijesuto,* 37(6), pp. 10–16, 1985.
Jodhau et al, "Liquid Crystalline Polyurethanes", Gordon Research Conf., Jul. 7, 1986.
Jimura et al., *Makromol Chem.,* 182, pp. 2569–2575, 1981.
Tanaka et al., *Polym. Prep. Japan,* 33(7), pp. 1647–1650, 1984.
Verbit et al., *Mol Cryst. Liq. Cryst.,* 1975, 30, pp. 87–99, 1972.
Tanaka et al., *Kobunshi Ronbunshu,* 43, pp. 311–314, 1986.

*Primary Examiner*—Maurice J. Welsh

[57] ABSTRACT

The inclusion of a polymer containing rigid moieties in an active hydrogen-containing compound has surprisingly been found to yield significant and unexpected improvements in the physical properties of polyurethane and/or polyurea polymers prepared therefrom. In particular, cellular polyurethane and/or polyureas made from these solutions have excellent firmness and high moduli.

37 Claims, No Drawings

POLYURETHANES PREPARED FROM SOLUTIONS OR DISPERSIONS OF POLYMERS OF RIGID POLYAROMATIC MONOMERS IN POLYOLS

CROSS-REFERENCE TO RELATED APPLICATION

This is a continuation-in-part of application Ser. No. 878,460, filed June 25, 1986 now.

BACKGROUND OF THE INVENTION

This invention relates to polyurethane polymers prepared from active hydrogen-containing materials which contain reinforcing polymers.

Various polymers are prepared from compounds and polymers which contain a plurality of active hydrogen atoms. Principal among these polymers are the polyurethanes and polyureas. In preparing these polymers, it is normally desirable to obtain the best possible physical properties. For example, when a flexible polymeric foam is prepared, it is often desirable to produce a foam which has good load-bearing, resiliency, and tensile properties.

The materials most commonly used in preparing polyurethanes and/or polyureas are polyethers and polyesters which contain two or more active hydrogen-containing groups. Although excellent polymers, both cellular and noncellular, are produced therefrom, it is desirable in certain instances to further improve their properties. One known method of improving the properties of polyurethanes made from polyethers or polyesters is to employ a dispersion of polymer particles in a continuous polyether or polyester polyol phase. These so-called polymer polyols or copolymer polyols contain addition polymers, polyurea or polyurethane-urea particles, or other polymers dispersed through the polyol as a plurality of colloidal (10–1000 nm) particles. The dispersed particles have been shown to improve various properties of the resulting cellular polyurethane and/or polyurea, and often perform a cell-opening function in the production of polyurethane and/or polyurea foam.

However, even with the use of a polymer polyol, improvement in certain properties of the polyurethane and/or polyurea polymer is desired. In particular, it is desirable to provide a cellular polyurethane and/or polyurea having high load-bearing. It is also desirable that it have a high modulus as later defined. Such high modulus foams are particularly suitable for automobile or other seating, in which the foam desirably feels soft as one sits on it, yet provides sufficient support for adequate comfort.

It would therefore be desirable to provide a polyurethane and/or polyurea polymer having improved physical properties and to provide an active hydrogen-containing composition which reacts with a polyisocyanate to produce a polyurethane and/or polyurea polymer having improved properties.

SUMMARY OF THE INVENTION

In one aspect, this invention is a solution or colloidal dispersion of a polymer of an ethylenically unsaturated polyaromatic compound, said compound containing a rigid moiety comprising at least two aromatic nuclei which are connected by a covalent bond or a rigid connecting group, said polymer being dispersed in an active hydrogen-containing compound having an average of at least two isocyanate-reactive groups per molecule.

In another aspect, this invention is a polyurethane and/or polyurea polymer prepared by reacting a polyisocyanate with the solution or dispersion of this invention.

In another aspect, this invention is a polyurethane and/or polyurea foam containing a polymer of an ethylenically unsaturated compound containing a rigid moiety comprising at least two aromatic nuclei which are connected by a covalent bond or a rigid connecting group.

This invention is also a crosslinked, noncellular or microcellular polyurethane and/or polyurea polymer containing a polymer of an ethylenically unsaturated compound containing a rigid moiety comprising at least two aromatic nuclei which are connected by a covalent bond or a rigid connecting group.

The inclusion of a solution or dispersion of this invention in an active hydrogen-containing composition has surprisingly been found to yield significant and unexpected improvements in the physical properties of polyurethane and/or polyurea polymers prepared therefrom. In particular, cellular polyurethane and/or polyurea polymers made from these solutions have excellent firmness and high moduli.

DETAILED DESCRIPTION OF THE INVENTION

In this invention, a polyol having dispersed or dissolved therein a polymer of an ethylenically unsaturated compound containing a rigid moiety comprising at least two aromatic nuclei which are connected by a covalent bond or a rigid group (sometimes referred to herein as a "polyaromatic monomer") is reacted with a polyisocyanate to form a polyurethane and/or polyurea polymer. The term "polyol" is used herein to broadly include compounds having a plurality of isocyanate-reactive groups, including hydroxyl, primary or secondary amine, carboxylic acid or mercaptan groups. The polymer of the polyaromatic monomer is one which is soluble or colloidally dispersable in an active hydrogen-containing compound, and which contains a plurality of pendant polyaromatic moieties as described herein attached to the backbone of the polymer. By colloidally dispersible, it is meant that the polymer can be dispersed in an active hydrogen-containing compound as a plurality of particles having an average diameter of about 10–1000 nm. Preferably, the polymer is soluble in the active hydrogen-containing compound, as the reinforcing characteristics are most apparent with soluble polymers.

The molecular weight of the polymer of the polyaromatic monomer is not especially critical when it is soluble in the active hydrogen-containing compound, as long as it is sufficiently high that the pendant rigid moieties can aggregate to form a reinforcing structure. Such structures are generally formed when the pendant rigid moieties have an aspect ratio of at least about 2.25, preferably at least about 2.4, more preferably at least about 6.4.

When the polymer is dispersed, rather than dissolved, in the active hydrogen-containing compound, its molecular weight and particle size are advantageously such that it is colloidally dispersed in the active hydrogen-containing compound.

The polymer used herein is an addition polymer prepared by homopolymerizing or copolymerizing an ethylenically unsaturated compound having an internal grouping having the structure

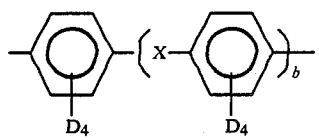

wherein b is a number from about 1 to about 10, preferably about 1 to about 3, more preferably 1 or 2; each D is independently hydrogen, inertly substituted lower alkyl, halogen, or, when ortho to the -X- linkage, may be such that the linkage X, the aromatic rings and a group D from each ring form a cyclic structure, and each X is independently a covalent bond or a group which provides a rigid linkage between the aromatic rings. Exemplary groups X include cycloalkyl groups, heterocyclic groups and groups which are capable of participating in conjugation with the aromatic rings, or permit the rings to participate in conjugation with each other. Suitable such groups include —N=N—, —N=C=N—, —C=C—, —C≡C—, —N=C=,

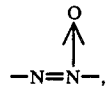

—COO—, —NHCO—, —NHCOO—, and the like. The group -X- may also be alkylene when it forms a cyclic structure with the groups D ortho to the -X- linkage. Exemplary such monomers are described, for example, in Tables 1-4, pages 108–120 of Blumstein, et al, "Liquid Crystalline Order in Polymers with Mesogenic Side Groups", *Liquid Crystalline Order in Polymers*, A. Blumstein, ed., Academic Press, Inc., New York (1978), as well as on pp. 61–107, Kelker and Hatz, *Handbook of Liquid Crystals*, Verlag Chemie GmbH, 1980, both of which are incorporated herein by reference.

A polymer containing pendant polyaromatic groups can be prepared by a free-radical polymerization of an ethylenically unsaturated monomer as described before. Suitable processes for the free-radical polymerization of ethylenically unsaturated monomers are well known in the art, and reference is made thereto for the purposes of this invention. The polymerization is conducted under conditions such that the resulting polymer is soluble or dispersible in an active hydrogen-containing compound or polymer.

Solution polymerization techniques are particularly suitable for polymerizing the ethylenically unsaturated monomer. In such solution polymerization, the monomer is polymerized in the presence of an inert solvent. By "inert" it is meant that the solvent does not react with the monomer, or otherwise undesirably interfere with its polymerization. When a solvent is used, it is advantageously stripped from the polymer after it is dissolved or dispersed in the active hydrogen-containing compound. Alternatively, the monomer can be polymerized in situ in the active hydrogen-containing compound or polymer. In such in situ polymerization, it is common practice to employ a dispersant to aid in the solubility or dispersability of the polymer. Particularly suitable dispersants include reaction products of the active hydrogen-containing compound and a difunctional compound having an active hydrogen-reactive group and an ethylenically unsaturated group, such as an ethylenically unsaturated isocyanate, anhydride, epoxide, carboxylic acid, carboxylic acid chloride and the like. Techniques for such in situ polymerization are taught, for example, in U. S. Pat. Nos. 4,460,715 and 4,394,491, incorporated by reference.

The polymerization is advantageously conducted in the presence of a source of free radicals. Any of the common free radical initiators such as the well known organic peroxides, peroxyesters and azo compounds are suitable for that purpose. In addition, radiation or other free radical sources can be used.

The polymerization is advantageously conducted at a temperature from about $-20°$ C. to about $150°$ C. The optimum polymerization temperature is, of course, dependent on the particular monomer used, the particular free radical initiator used, if any, and other circumstances which are well known in polymerizing ethylenically unsaturated monomers.

In order to control the molecular weight of the polymer, it may be advantageous to adjust the level of initiator used, or to employ a chain transfer agent in the polymerization. Typically, the use of a greater quantity of a free radical initiator or chain transfer agent tends to decrease the molecular weight of the resulting polymer. Thus, a free radical initiator is advantageously employed in an amount from about 0.01 to about 10, preferably about 0.05 to about 5 parts per 100 parts monomer. Suitable chain transfer agents include, for example, mercaptans, carboxylic acids, halogen containing compounds and the like. These and other suitable chain transfer agents are described, for example, in European Patent Publication No. 0091036A2.

The rigid monomer may be homopolymerized or copolymerized with another monomer. Any such copolymerization may be a random copolymerization, or a block or graft copolymerization. The sole limitation on such other monomer is that it must be of such composition and present in such an amount such that the polyaromatic moieties can aggregate to form a reinforcing structure. Typically, this is accomplished when the polyaromatic monomer constitutes at least about 25, preferably about 35–100, more preferably about 50–100 mole percent of the monomers.

Suitable monomers which are useful comonomers include those described in U. S. Pat. No. 4,394,491, incorporated by reference. Of particular interest are the acrylic and methacrylic esters, especially hydroxyalkyl acrylates and methacrylates; the unsaturated nitriles, particularly acrylonitrile; and the vinyl aromatics, particularly styrene.

The polymer is dissolved or dispersed in an active hydrogen-containing compound. The active hydrogen-containing compound can be of any composition as long as the polymer is soluble or dispersible therein at beneficial proportions. By "soluble or dispersible at beneficial proportions" it is meant that a sufficient amount the polymer can be dissolved or dispersed into the active hydrogen-containing compound to provide property or processing improvements to a polyurethane and/or polyurea polymer prepared therefrom. Typically, such improvement is seen when at least about 1, preferably about 1–80, more preferably about 3–60 parts by weight of a dispersed rigid polymer are present per 100 parts of the active hydrogen-containing compound. When the polymer is dissolved in the active hydrogen-containing compound, preferably about 1–20, more preferably about 1-10 parts by weight are present per 100 parts of the active hydrogen-containing compound.

The active hydrogen-containing compound in which the polymer is dispersed is selected according to the properties which are desired in a polyurethane and/or polyurea polymer prepared therefrom. It is well known to employ various equivalent weight and functionality active hydrogen-containing compounds to produce polyurethane and/or polyurea polymers having various properties. For example, in the preparation of elastomeric polyurethanes and/or polyureas, relatively high equivalent weight (400–10,000) and low functionality (2–4 functional) active hydrogen-containing compounds are preferred. For making more rigid polyurethanes and/or polyureas, lower equivalent weight (31–1000), higher functionality (2–16 functional) materials are preferred. The selection of proper active hydrogen-containing compounds for use in preparing particular polyurethane and/or polyurea polymers is considered to be a matter of ordinary choice to one skilled in the art.

Suitable active hydrogen-containing compounds are described in U.S. Pat. No. 4,394,491, incorporated herein by reference. Preferred such compounds are polyether polyols and the corresponding amine-terminated polyethers; polyester polyols; the so-called polymer polyols, particularly those containing dispersed polymers of ethylenically unsaturated monomers, polyurea polymers or polyurethane-polyurea polymers; alkylene glycols and amine-terminated chain extenders as are described in U.S. Pat. No. 4,218,543. Most preferred are polyether polyols having a functionality of about 2–4 and an equivalent weight of about 800–3000, the corresponding amine-terminated polyethers, and copolymer polyols having dispersed polymers of ethylenically unsaturated non-rigid monomers prepared from such polyether polyols as well as mixtures of these materials with alkylene glycols and/or amine-terminated chain extenders. It has surprisingly been found the the typical reinforcing effects of copolymer polyols are further increased with the use of a solution or dispersion of this invention.

The solution or dispersion of this invention is formed into a polyurethane and/or polyurea polymer by reaction with a polyisocyanate. Procedures for conducting this reaction are well known and described, for example, by Ulrich, "Urethane Polymers", *The Kirk-Othmer Encyclopedia of Chemical Technology*, 3rd ed., Vol. 23, New York (1983), pp. 576–608.

Either aromatic or aliphatic organic polyisocyanates having an average of at least 2 isocyanate groups per molecule are useful. Such polyisocyanates are described, for example, in U.S. Pat. Nos. 4,065,410, 3,401,180, 3,454,606, 3,152,162, 3,492,330, 3,001,973, 3,594,164, and 3,164,605, all incorporated by reference.

Aromatic polyisocyanates which are particularly useful herein include 2,4- and/or 2,6-toluene diisocyanate, diphenylmethanediisocyanate, p-phenylene diisocyanate, polymethylenepolyphenylpolyisocyanates, mixtures thereof and the like. Also useful are polymeric derivatives of diphenylmethanediisocyanate as well as prepolymers or quasi-prepolymers thereof.

Particularly useful aliphatic polyisocyanates include, for example, the hydrogenated derivatives of the foregoing aromatic polyisocyanates, as well as hexamethylene diisocyanate, isophoronediisocyanate, 1,4-cyclohexane diisocyanate and the like.

In addition, prepolymers and quasi-prepolymers of the foregoing polyisocyanates having an —NCO content of about 0.5 to about 30% by weight are useful herein.

The polyisocyanate is advantageously present in an amount sufficient to provide in the reaction mixture from about 70 to about 500, preferably about 80 to about 150, and more preferably about 95 to about 120 isocyanate groups per 100 active hydrogen-containing groups. Higher amounts of the polyisocyanate can be used when the formation of an isocyanurate-containing polymer is desired.

In general, noncellular polyurethane and/or polyurea elastomers (those having an unfilled density of at least about 0.8 g/cc) are prepared by reacting a relatively high equivalent weight active hydrogen-containing compound (preferably 800–3000 molecular weight) and a chain extender compound with a polyisocyanate. The chain extender compound advantageously has an equivalent weight of from about 31–250 and a functionality of about 2–4, preferably about 2. The chain extender is preferably a glycol or a diamine, with $C_2$–$C_6$ alkylene glycols and stearically hindered aromatic diamines being preferred. In preparing noncellular or microcellular elastomers, a conventional casting process, particularly a solventless casting process, or a reaction injection molding process can be employed. Suitable casting techniques are described, for example, in U.S. Pat. No. 4,556,703. Reaction injection molding techniques are described, for example, in Sweeney, F. M., *Introduction to Reaction Injection Molding*, Technomics, Inc., 1979, incorporated by reference. Suitable formulations for use in RIM processes are described, for example, in U.S. Pat. Nos. 4,269,945, 4,218,610, 4,297,444, 4,530,941, all incorporated by reference. In these formulations substitution of all or a portion of one or more of the active hydrogen-containing compounds is substituted with a solution or dispersion of this invention in which the polyol has a similar equivalent weight, functionality and reactivity.

In preparing elastomeric polyurethane and/or polyurea polymers, either a one-shot or two-shot (i.e. prepolymer) process can be employed. In the two-shot process, all or most of the relatively high equivalent weight active hydrogen-containing compound is reacted with an excess of a polyisocyanate to form an isocyanate-terminated prepolymer, which is then reacted with the chain extender and any remaining high equivalent weight material. In the one-shot process, most or all of the relatively high equivalent weight material is mixed with the chain extender and the mixture is reacted with the polyisocyanate. However, certain prepolymers and quasi-prepolymers may be employed as the polyisocyanate component even in a one-shot process. Preferably, the polyurethane and/or polyurea polymer is cellular, i.e. has an unfilled density of less than about 0.8 g/cc. More preferably, the polyurethane and/or polyurea is a flexible polyurethane foam. Such flexible polyurethane foam is advantageously prepared by reacting a relatively high equivalent weight solution or dispersion of this invention with a polyisocyanate in the presence of a blowing agent. In preparing flexible polyurethane foams, it is advantageous to also employ a surfactant to stabilize the foaming reaction mass and to compatibilize the various components of the reaction mixture, and to employ various catalysts for both the urethane forming and blowing reactions. In addition, a crosslinker such as diethanolamine is often employed to promote rapid initial curing.

In preparing flexible polyurethane foam, the major active hydrogen-containing compound(s) in the solution or dispersion advantageously has an equivalent weight of about 800-3000 and an average functionality (defined herein as the number of active hydrogen-containing groups per molecule) from about 2 to about 4, more preferably about 2-3.

Suitable blowing agents for preparing foams are well known and include, for example, water, low boiling halogenated alkanes such as methylene chloride, monochlorodifluoromethane, dichlorodifluoromethane, dichloromonofluoromethane and the like, the so-called "azo" blowing agents, finely divided solids and the like as well as other materials which generate a gas under the conditions of the foaming reaction. Water, the halogenated methanes or mixtures thereof are preferred. When water is used as the blowing agent, about 0.5 to about 10, preferably about 1 to about 5 parts by weight are used per 100 parts of active hydrogen-containing compound(s). The halogenated alkanes are typically used in an amount from about 5 to about 75 parts per 100 parts by weight of active hydrogen-containing compound(s). However, the use of varying amounts of blowing agents to achieve a desired density is well known in the art, and it may in some instances be advantageous to use amounts of blowing agents outside of the ranges mentioned before.

Suitable surfactants include the diverse silicone surfactants, preferably those which are block copolymers of a polysiloxane and a poly(alkylene oxide). Suitable such surfactants include Y-10184 surfactant, available from Union Carbide Corporation, and the like. Surfactants are used in an amount sufficient to stabilize the foaming reaction mixture against collapse until the foam is cured, and to promote the formation of a somewhat uniform cell structure. Typically, about 0.1 to about 5, preferably about 0.3 to about 3 parts by weight of surfactant are employed per 100 parts of active hydrogen-containing compound(s).

Crosslinkers which are commonly employed in preparing flexible polyurethane foams include low equivalent weight alkanolamines such as ethanolamine, diethanolamine, triethanolamine, propanolamine, dipropanolamine, tripropanolamine, methyldiethanol amine, methyl dipropanol amine, and the like. Also useful are the alkylene glycols and low equivalent weight hydroxyl-terminated polyols such as glycerine and trimethylolpropane. Such crosslinkers are generally used in minor amounts, preferably about 0.2 to about 10, more preferably about 0.5-5 parts per 100 parts of relatively high equivalent weight active hydrogen-containing compounds.

Catalysts for preparing polyurethane and/or polyurea foams include organometallic catalysts and tertiary amine compounds. Of the organometallic catalysts, organotin catalysts are generally preferred. Suitable catalysts are described, for example, in U.S. Pat. No. 4,495,081, incorporated herein by reference. When using such catalysts, an amount sufficient to increase the rate of the urethane-forming (and foaming reactions, when a cellular polymer is formed) is used. Typically, about 0.001 to about 0.5 part of an organometallic catalyst is used per 100 parts of active hydrogen-containing compound(s). Tertiary amine-containing compounds are used in amounts ranging from about 0.1 to abut 3 parts per 100 parts of active hydrogen-containing material. When polyisocyanurate foams are produced, alkali metal compounds are usefully employed as trimerization catalysts.

The foam can be prepared in any convenient manner. The foam can be prepared by reacting the components in a closed mold, or by permitting the reacting components to freely rise. Processes for preparing polyurethane foams are described, for example, in U.S. Pat. No. 4,451,588, incorporated by reference.

In addition to preparing flexible foams and noncellular elastomers, the solution or dispersion of this invention is useful in preparing rigid cellular and noncellular polyurethane and/or polyurea polymers. Methods for making such materials are described, for example, in U.S. Pat. Nos. 4,579,844 and 4,569,951, incorporated herein by reference. Rigid polyurethane foams are advantageously prepared using active hydrogen-containing compounds having an equivalent weight from about 31-400 and an average functionality of about 3-16, preferably about 3 to about 8.

The polyurethane and/or polyurea polymers of this invention are useful, for example, as seating, cushioning, industrial elastomers, automobile fascia and bumpers, thermal insulation and the like.

The following examples are provided to illustrate the invention, but are not intended to limit the scope thereof. All parts and percentages are by weight unless otherwise indicated.

EXAMPLE 1

A. Preparation of Polyaromatic Monomer

Into a suitable reactor are placed 65 parts of a 1650 equivalent weight ethylene oxide-capped poly(propylene oxide) having a nominal functionality of 3.0 (Polyol A), 119 parts of an IEM-capped polyol which is prepared by reacting IEM with Polyol A at a mole ratio of 0.374, and 12.8 parts of a rigid monomer having the structure

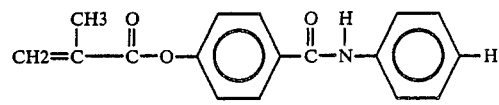

which is separately prepared by reacting methacryloyl chloride with the reaction product of phenylisocyanate and para-hydroxy benzoic acid. This mixture is heated to about 140° C. and to it is added at that temperature, over a period of about one hour, a mixture of 119 parts of the IEM-capped polyol and 0.65 grams azobis(isobutyronitrile). Following complete addition of the initiator solution, the reaction mixture is heated at about 140° C. for an additional 4 hours. The resulting product is a solution of a polymer of the polyaromatic monomer in Polyol A.

Six parts of this solution are placed in a reactor along with 14.91 parts of the rigid monomer and 108 parts of Polyol A. This mixture is heated to a temperature of 140° C., upon which the solid monomer melts. Then, 23 parts of Polyol A in which 0.6 part of azobis(isobutyronitrile) and 2.8 parts of a solution of the rigid polymer in Polyol A are added over a period of about 30 minutes at 140° C. Following this addition, the mixture is heated for another 30 minutes and cooled. The resulting product is a dispersion of particles of a reinforcing polymer in Polyol A.

B. Preparation of Polyurethane Foam

A molded, high resiliency foam (Sample No. 1) is prepared using the formulation described in Table 1 following. The proportions of the dispersion from Example 1-A and the copolymer polyol are such that the mixture contains 10% by weight SAN particles (from the copolymer polyol and 2.6% by weight liquid crystalline polymer particles.

TABLE 1

| Component | Parts by Weight |
| --- | --- |
| Dispersion from Example 1-A/Copolymer polyol blend | 100 |
| Water | 3.8 |
| Silicone Surfactant[1] | 1.65 |
| Tertiary Amine Catalyst[2] | 0.24 |
| Catalyst A[3] | 0.12 |
| Organotin catalyst B[4] | 0.0042 |
| Diethanolamine | 1.7 |
| Toluene diisocyanate[5] | 105 index |

[1]Y-10184 silicone surfactant, sold by Union Carbide Corporation
[2]bis(N,N—dimethylaminoethyl)amine
[3]A 33 weight percent solution of triethylenediamine in dipropylene glycol
[4]Dimethyltindilaurate
[5]An 80/20 by weight mixture of the 2,4- and 2,6- isomers For comparison, a molded foam (Comparative Sample A) is prepared using the same formulation, except that the polyol mixture of Example 1 is replaced with a 10% solids copolymer polyol containing 70/30 SAN particles. The properties of Sample No. 1 and Comparative Sample A are as reported in Table 2 following.

TABLE 2

| Property | A* | Sample No. 1 |
| --- | --- | --- |
| % Polyaromatic polymer[1] | 0 | 2.6 |
| CPP solids[2] | 10 | 10 |
| Density, lb/ft[3] | 1.87 | 2.09 |
| Tensile Str[3], psi | 22.8 | 21.3 |
| Elongation[3], % | 107 | 139 |
| Tear Str, pli[4] | 1.81 | 2.42 |
| Resiliency, %[5] | 55 | 47 |
| Compression Set[6] Cd | 13.1 | 20.9 |
| ILD[7] | | |
| 25% | 22 | 21 |
| 65% | 53 | 64 |
| ret 25% | 17 | 16 |
| Modulus[8] | 2.41 | 3.05 |
| Air Flow[9] | 4.8 | 5.7 |

*Not an example of this invention
[1]From Example 1-A.
[2]% styrene/acrylonitrile particles in the polyols
[3]ASTM 3574-81 Test E
[4]ASTM 3574-81 Test F
[5]ASTM 3574-81 Test H
[6]ASTM 3574-81 Test D
[7]ASTM 3574-81 Test B. ILD is indentation load deflection.
[8]Ratio of 65% ILD to 25% ILD.
[9]ASTM 3574-81

As can be seen from the data in Table 2, very substantial increases in modulus and 65% ILD are obtained with the presence of a small quantity of liquid crystal polymer in the foam formulation.

EXAMPLE 2

A. Preparation of 2-(4-biphenyloxy)ethyl methacrylate

In a suitable flask are charged 2040 g 4-phenyl phenol, 1216 g ethylene carbonate and 40 g triethyl amine. This mixture is heated under nitrogen to 125° C. for about 3 hours, and then to 150° C. for another hour, until the evolution of gas becomes very slow. The hot product is recrystallized in toluene to provide 2281 g of 2-(4-biphenyloxy)ethoxy ethanol. A 750-g portion of this product is combined with 1200 g methylmethacrylate, 35 g hydroquinone and 18 g concentrated sulfuric acid. The mixture is heated to about 100°-120° C. under nitrogen in an oil bath for about 5 hours. The resulting mixture is dissolved in 1040 ml toluene followed by 1040 ml of cyclohexane, after which a precipitate forms. The suspension is then neutralized with ammonia and filtered. Three grams of hydroquinone are added and 2-(4-biphenyloxy) ethanol precipitates. The solution is then washed with 500 ml of 5% aqueous NaOH and 500 ml of water and dried. A small quantity of p-methoxyphenol is added and the solution concentrated under vacuum. The solution (840 g) is mixed with 900 ml of acetonitrile at −5° C., and the product precipitates. The product (rigid monomer A) is washed with −10° C. acetonitrile and dried in a vacuum oven. It has a melting point of 58°-60° C.

B. Preparation of Solution of a Polymer of Rigid Monomer A in Polyol

Into a suitable reactor equipped with a nitrogen pad are mixed 9 g of Rigid Monomer A and 200 g of the IEM-capped polyol described in Example 1. The mixture is heated to about 120° C. to melt the monomer and aid mixing. A clear fluid is obtained. To this mixture is added, over a 90 minute period, a homogenized mixture of 60 grams of a 1000 equivalent weight, nominally trifunctional poly(propylene oxide-ethylene oxide) (Polyol B), 64 grams of the IEM-capped polyol, 3.99 g of hydroxyethylacrylate and 0.72 parts of azobis-(isobutyronitrile). After the addition is complete, the reaction mixture is heated for an additional four hours at 120° C. Following this period, the product is vacuum stripped to remove volatile impurities. The product is a solution containing about 3.8 weight percent of the copolymer of hydroxyethylacrylate and rigid monomer A, to which copolymer is believed to be grafted a portion of the IEM-capped polyol.

C. Preparation of Slabstock Polyurethane Foam

A slabstock foam is prepared by reacting 100 parts by weight of the solution of Example 2-B, 0.1 part of an amine catalyst, 0.2 part of an organotin catalyst, 1 part of a silicone surfactant and an 80/20 mixture of the 2,4- and 2,6- isomers of TDI. This foam is designated Example No. 2, and its physical properties are as indicated in Table 2 following. For comparison, a foam is made from a like formulation, except the solution of Example 2-B is replaced with a copolymer polyol containing Polyol B as a continuous phase and 10 weight percent of 70/30 SAN particles as the dispersed phase. This foam is designated Comparative Sample B and has properties as indicated in Table 2 following.

D. Preparation of Dispersion of Polymerized Rigid Monomer A in Polyol

In a suitable reactor are blended 210 g Polyol B, 40 g of Rigid Monomer A and 32 g of the product from Example 2-B. This blend is heated to 120° C., and to it is added, over a 90 minute period, a mixture of 1.09 g azobis(isobutyronitrile), 98 g of Polyol B and 8 g of the product from Example 2-B. After the monomer stream is added, the mixture is maintained at 120° C. for an additional 4 hours, after which the product is vacuum stripped to remove any volatile impurities. The resulting product is a dispersion containing about 10 weight percent of polymerized Rigid Monomer A. This dispersion is then foamed in the same manner as Example No. 2 and Comparative Sample B, with results as indicated as Example No. 3 in Table 3 following.

TABLE 3

| Property | B* | 2 | 3 |
|---|---|---|---|
| % Rigid Polymer[1] | 0 | 3.8 | 10 |
| % CPP solids[2] | 10 | 0 | 0 |
| Density, lb/ft[2] | 1.34 | 1.27 | 1.31 |
| Tensile Str, psi[3] | 21 | 18.5 | 18.5 |
| Elongation, % | 195 | 222 | 172 |
| Tear Str, pli[4] | 3.03 | 2.62 | 2.82 |
| Compresson Set[5] Ct | 46.1 | 26.4 | 50 |
| ILD[6] | | | |
| 25% | 48 | 83 | 57 |
| 65% | 80 | 153 | 103 |
| ret 25% | 32 | 48 | 36 |
| Modulus[7] | 1.67 | 1.84 | 1.81 |
| Air Flow[8] | 2.7 | 2.7 | 3.2 |

*Not an example of this invention.
N.D. means not determined.
[1]In Example 2, the proportion of HEA/Rigid Monomer A copolymer. In Example 3, the proportion of polymer of Rigid Monomer A.
[2]% sytrene/acrylonitrile particles in the polyols
[3]ASTM 3574-81 Test E
[4]ASTM 3574-81 Test F
[5]ASTM 3574-81 Test D
[6]ASTM 3574-81 Test B. ILD is indentation load deflection.
[7]Ratio of 65% ILD to 25% ILD.
[8]ASTM 3574-81

As can be seen from the data in Table 3, very substantial improvements in load bearing are obtained with this invention.

What is claimed is:

1. A solution or colloidal dispersion of a polymer of an ethylenically unsaturated polyaromatic compound, said compound containing a rigid moiety comprising at least two aromatic nuclei which are connected by a covalent bond or a rigid connecting group, said polymer being dissolved or dispersed in an active hydrogen-containing compound having an average of at least two isocyanate-reactive groups per molecule.

2. The solution or colloidal dispersion of claim 1 wherein said ethylenically unsaturated polyaromatic compound has an internal grouping having the structure

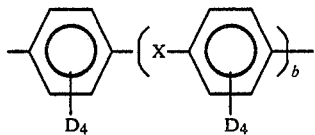

wherein b is a number from about 1 to about 10, each D is independently hydrogen, inertly substituted lower alkyl, halogen, or, when ortho to the -X- linkage, may be such that the linkage X, the aromatic rings and a group D from each ring form a cyclic structure, and each X is independently a covalent bond or a group which provides a rigid linkage between the aromatic rings.

3. The solution or colloidal dispersion of claim 2 wherein said active hydrogen-containing compound has an equivalent weight from about 400 to about 10,000 and a functionality of about 2 to about 4.

4. The solution or colloidal dispersion of claim 3 wherein said polymer of an ethylenically unsaturated polyaromatic compound is dissolved in the active hydrogen-containing compound, and about 1 to about 20 parts by weight thereof are present per 100 parts of active hydrogen-containing compound.

5. The solution of claim 4 wherein said active hydrogen-containing compound is a hydroxyl-terminated or primary or secondary amine-terminated polyether.

6. The solution of claim 5 further comprising a blowing agent.

7. The solution of claim 6 wherein the polyether has an equivalent weight of about 800 to about 3000, and wherein the solution further comprises a silicone surfactant.

8. The solution of claim 7 which further comprises from about 0.2 to about 10 parts by weight of a crosslinker per 100 parts of the polyether.

9. The solution of claim 5 further comprising an α,ω-alkylene glycol or aromatic diamine chain extender.

10. The solution or colloidal dispersion of claim 3 wherein said polymer of an ethylenically unsaturated polyaromatic compound is dispersed in the active hydrogen-containing compound, and about 1 to about 80 parts by weight thereof are present per 100 parts of active hydrogen-containing compound.

11. The colloidal dispersion of claim 10 wherein said active hydrogen-containing compound is a hydroxyl-terminated and/or primary or secondary amine-terminated polyether.

12. The colloidal dispersion of claim 11 further comprising a blowing agent.

13. The colloidal dispersion of claim 12 wherein the polyether has an equivalent weight of about 800 to about 3000, and wherein the solution further comprises a silicone surfactant.

14. The colloidal dispersion of claim 13 which further comprises from about 0.2 to about 10 parts by weight of a crosslinker per 100 parts of the polyether.

15. The colloidal dispersion of claim 11 further comprising an α,ω-alkylene glycol or aromatic diamine chain extender.

16. The solution or colloidal dispersion of claim 7, 9, 13 or 15 wherein each X is independently a covalent bond, a cycloalkyl group, —N=N—, —N=C=N—,

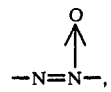

—COO—, —NHCO—, —NHCOO—, —C=C—, —C≡C— or —N=C—, and b is 1 or 2.

17. A polyurethane and/or polyurea polymer prepared by reacting a polyisocyanate with the solution or colloidal dispersion of claim 1.

18. A polyurethane and/or polyurea polymer prepared by reacting a polyisocyanate with the solution or colloidal dispersion of claim 3.

19. A polyurethane and/or polyurea polymer prepared by reacting a polyisocyanate with the solution of claim 7.

20. A polyurethane and/or polyurea polymer prepared by reacting a polyisocyanate with the solution of claim 9.

21. A polyurethane and/or polyurea polymer prepared by reacting a polyisocyanate with the colloidal dispersion of claim 13.

22. A polyurethane and/or polyurea polymer prepared by reacting a polyisocyanate with the colloidal dispersion of claim 15.

23. The solution or colloidal dispersion of claim 2 wherein said active hydrogen-containing compound has an equivalent weight from about 31 to about 1000 and an average functionality of about 2.5 to about 16.

24. The solution or colloidal dispersion of claim 23 wherein said polymer of an ethylenically unsaturated polyaromatic compound is dissolved in the active hydrogen-containing compound, and about 1 to about 20 parts by weight thereof are present per 100 parts of active hydrogen-containing compound.

25. The solution of claim 24 further comprising a blowing agent and a surfactant.

26. The solution or colloidal dispersion of claim 23 wherein said polymer of an ethylenically unsaturated polyaromatic compound is dispersed in the active hydrogen-containing compound, and about 1 to about 80 parts by weight thereof are present per 100 parts of active hydrogen-containing compound.

27. The colloidal dispersion of claim 26 further comprising a blowing agent and a surfactant.

28. A polyurethane and/or polyurea polymer prepared by reacting a polyisocyanate with the colloidal dispersion of claim 23.

29. A polyurethane and/or polyurea foam containing a polymer of an ethylenically unsaturated compound containing a rigid moiety comprising at least two aromatic nuclei which are connected by a covalent bond or a rigid connecting group.

30. The polyurethane and/or polyurea foam of claim 29 which is the reaction product of a reaction mixture comprising an active hydrogen-containing compound and a polyisocyanate, and said polymer of an ethylenically unsaturated compound is present in an amount from about 1 to about 80 parts by weight per 100 parts by weight active hydrogen-containing compound.

31. The polyurethane and/or polyurea foam of claim 30 wherein said ethylenically unsaturated compound has an internal grouping as represented by the structure

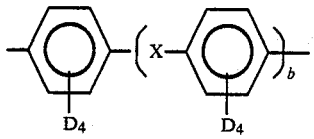

wherein b is a number from about 1 to about 10, each D is independently hydrogen, inertly substituted lower alkyl, halogen, or, when ortho to the -X- linkage, may be such that the linkage X, the aromatic rings and a group D from each ring form a cyclic structure, and each X is independently a covalent bond or a group which provides a rigid linkage between the aromatic rings.

32. The polyurethane and/or polyurea foam of claim 31 which is a rigid foam.

33. The polyurethane and/or polyurea foam of claim 31 which is a flexible foam.

34. A crosslinked, noncellular or microcellular polyurethane and/or polyurea polymer containing a polymer of an ethylenically unsaturated compound containing a rigid moiety comprising at least two aromatic nuclei which are connected by a covalent bond or a rigid connecting group.

35. The polyurethane and/or polyurea polymer of claim 34 which is the reaction product of a reaction mixture comprising an active hydrogen-containing compound and a polyisocyanate, and said polymer of an ethylenically unsaturated compound is present in an amount from about 1 to about 80 parts by weight per 100 parts by weight active hydrogen-containing compound.

36. The polyurethane and/or polyurea polymer of claim 35 wherein said ethylenically unsaturated compound has an internal grouping as represented by the structure

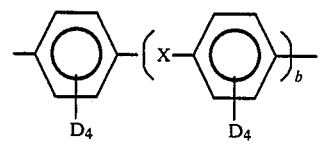

wherein b is a number from about 1 to about 10, each D is independently hydrogen, inertly substituted lower alkyl, halogen, or, when ortho to the -X- linkage, may be such that the linkage X, the aromatic rings and a group D from each ring form a cyclic structure, and each X is independently a covalent bond or a rigid connecting group.

37. The polyurethane and/or polyurea polymer of claim 36 wherein said active hydrogen-containing compound comprises a mixture comprising a hydroxyl-terminated or primary or secondary amine-terminated polyether having an equivalent weight for about 1000 to about 3000, and an $\alpha,\omega$-alkylene glycol, $\alpha,\omega$-glycol ether and/or aromatic diamine chain extender.

* * * * *